United States Patent
Sato et al.

(10) Patent No.: US 10,381,171 B2
(45) Date of Patent: Aug. 13, 2019

(54) ELECTRIC STORAGE CELL, COVERING FILM AND ELECTRIC STORAGE MODULE

(71) Applicant: TAIYO YUDEN CO., LTD., Taito-ku, Tokyo (JP)

(72) Inventors: Hiromi Sato, Takasaki (JP); Tomofumi Akiba, Takasaki (JP); Shinji Ishii, Takasaki (JP); Katsunori Yokoshima, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 243 days.

(21) Appl. No.: 15/041,861

(22) Filed: Feb. 11, 2016

(65) Prior Publication Data

US 2016/0260552 A1 Sep. 8, 2016

(30) Foreign Application Priority Data

Mar. 4, 2015 (JP) .................................. 2015-042848
Nov. 18, 2015 (JP) .................................. 2015-225920

(51) Int. Cl.
*H01G 11/80* (2013.01)
*H01M 2/04* (2006.01)
(Continued)

(52) U.S. Cl.
CPC ............. *H01G 11/80* (2013.01); *H01G 11/78* (2013.01); *H01M 2/0275* (2013.01);
(Continued)

(58) Field of Classification Search
CPC combination set(s) only.
See application file for complete search history.

(56) References Cited

U.S. PATENT DOCUMENTS

2014/0030564 A1* 1/2014 Lee .................. H01M 2/12
  429/82
2014/0272488 A1* 9/2014 Kim .................. H01M 2/021
  429/56

FOREIGN PATENT DOCUMENTS

CN 101567466 A 10/2009
CN 201766106 U 3/2011
(Continued)

OTHER PUBLICATIONS

A First Office Action issued by the State Intellectual Property Office of China dated Dec. 22, 2017 for Chinese counterpart application No. 201610113252.4.
(Continued)

Primary Examiner — Christopher P Domone
(74) Attorney, Agent, or Firm — Law Office of Katsuhiro Arai

(57) ABSTRACT

An electric storage cell has an electric storage element and a covering body. The covering body houses the electric storage element and has a metal layer with a first principal face on the electric storage element side and a second principal face on the opposite side, an internal resin layer made of resin laminated onto the first principal face, and an external resin layer made of resin laminated onto the second principal face, with a groove part formed on the second principal face side of the metal layer. The above structures provides a highly reliable electric storage cell, covering film, and electric storage module capable of releasing the rising internal pressure safely in the event of abnormality.

17 Claims, 13 Drawing Sheets

(51) Int. Cl.
*H01M 2/02* (2006.01)
*H01M 2/12* (2006.01)
*H01G 11/78* (2013.01)

(52) U.S. Cl.
CPC ....... *H01M 2/0277* (2013.01); *H01M 2/0285* (2013.01); *H01M 2/0287* (2013.01); *H01M 2/0292* (2013.01); *H01M 2/1241* (2013.01); *H01M 2/021* (2013.01); *H01M 2/0212* (2013.01); *Y02E 60/13* (2013.01)

(56) References Cited

FOREIGN PATENT DOCUMENTS

| | | | |
|---|---|---|---|
| CN | 102623749 A | | 8/2012 |
| JP | 2005203262 A | | 7/2005 |
| WO | WO2013115549 | * | 8/2013 |

OTHER PUBLICATIONS

A Second Office Action issued by the State Intellectual Property Office of China dated Nov. 5, 2018 for Chinese counterpart application No. 201610113252.4.

* cited by examiner

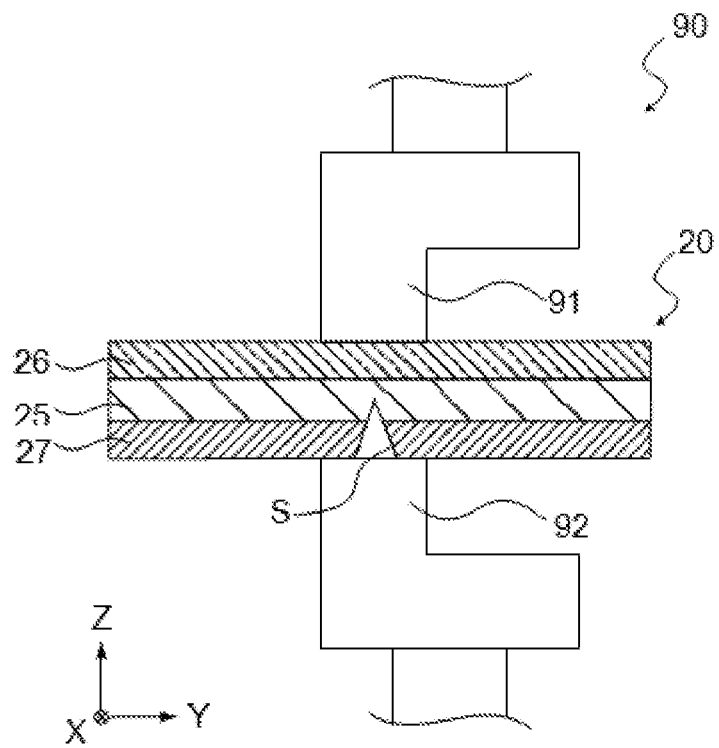
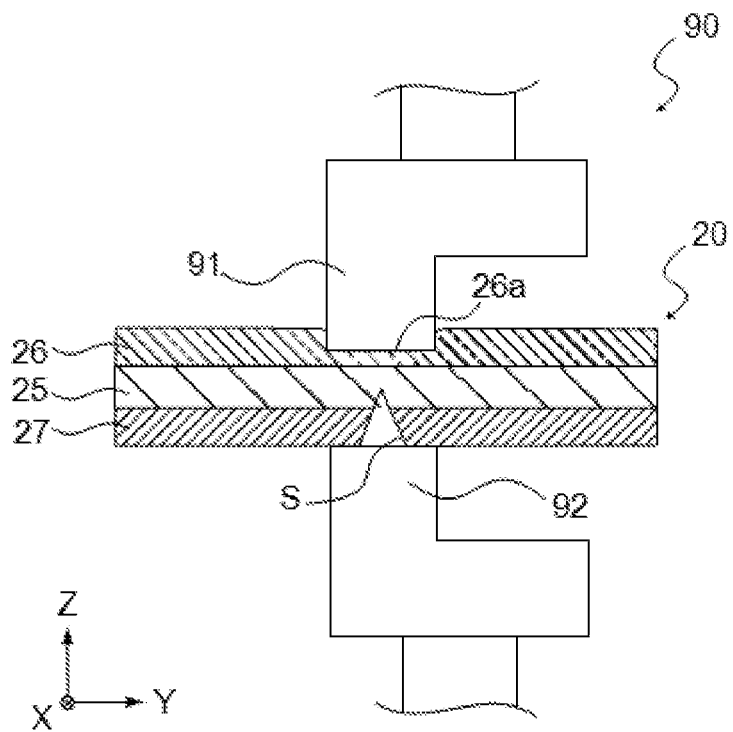

FIG. 20

| Unit (MPa) | Electric storage cell A | | Electric storage cell B | |
| --- | --- | --- | --- | --- |
| | Without thin part | With thin part | Without thin part | With thin part |
| Free | 0.100 | 0.031 | 0.165 | 0.096 |
| Pressed | 0.429 | 0.356 | 0.427 | 0.269 |

ELECTRIC STORAGE CELL, COVERING FILM AND ELECTRIC STORAGE MODULE

BACKGROUND

Field of the Invention

The present invention relates to an electric storage cell comprising an electric storage element sealed by a covering film, to a covering film, and also to an electric storage module comprising a stack of such electric storage cells.

Description of the Related Art

Film-covered electric storage cells, each comprising an electric storage element sealed by a covering film, are widely used in recent years. Film-covered electric storage cells are subject to rising pressure in the electric storage cell due to generation of gaseous species as a result of electrolysis of the electrolytic medium during use, if the control circuit of the electric storage cell fails for some reason and abnormal voltage is applied or the ambient temperature rises to an abnormally high level for some reason. As the internal pressure of the film-covered electric storage cell rises, eventually its covering material ruptures and gas erupts from the ruptured location; since it is impossible to predict where the covering material will rupture, however, the surrounding equipment, etc., may be negatively affected depending on the ruptured location.

To solve this problem, Patent Literature 1, for example, discloses a constitution where a peninsula-shaped projecting fusion part is provided in the seal part of the covering film and a through hole is formed in the projecting fusion part in order to release the pressure in case the covering film expands and its separation progresses. This way, the tear-off stress generated by the expansion of the film can be concentrated to the projecting fusion part to facilitate the progression of separation, so that the pressure is easily released as the film expands.

Background Art Literatures

Japanese Patent Laid-open No. 2005-203262

SUMMARY

With the constitution of Patent Literature 1, however, the through hole and the narrow seal width of the projecting fusion part may result in moisture content permeating through the fusion resin layer to affect long-term reliability. Also, there are constitutions other than the one described in Patent Literature 1, where the expanded covering film is penetrated and broken by a projecting object to release the internal pressure; however, these constitutions add to cost because a projecting part must be attached for each device, for example. Handling of the device also requires caution because of the projecting part.

In light of the aforementioned circumstance, an object of the present invention is to provide a highly reliable electric storage cell, covering film, and electric storage module capable of safely releasing the rising internal pressure in the event of abnormality.

Any discussion of problems and solutions involved in the related art has been included in this disclosure solely for the purposes of providing a context for the present invention, and should not be taken as an admission that any or all of the discussion were known at the time the invention was made.

To achieve the above object, an electric storage cell pertaining to an embodiment of the present invention has an electric storage element and a covering body.

The covering body houses the electric storage element and has a metal layer with a first principal face on the electric storage element side and a second principal face on the opposite side, an internal resin layer made of resin laminated onto the first principal face, and an external resin layer made of resin laminated onto the second principal face, with a groove part formed on the second principal face side of the metal layer. The groove part may be formed in the second principal face of the metal layer through the external resin layer which may be the outermost layer.

According to this constitution, rise in the internal pressure of the electric storage cell due to abnormality of the electric storage cell causes the metal layer to rupture at the location where the groove is formed, and the internal resin layer expands through the resulting opening. As the internal pressure rises further, the internal resin layer ruptures and the internal pressure is released. In other words, the internal pressure is released at the location where the groove part is formed and therefore pressure release from parts other than the groove part can be prevented. Also, in a normal state (when no abnormality is present in the electric storage cell), permeation of moisture content into the housing space is prevented by the metal layer, which allows for ensuring of reliability of the electric storage cell.

The covering body may have a first region where the internal resin layer has a first thickness and a second region where the internal resin layer has a second thickness smaller than the first thickness, and the groove part may be formed in the second region. The first region and the second region are defined in along a thickness direction.

According to this constitution, the second region of the smaller thickness is formed at the location where the groove part is present, and therefore the internal pressure can be released at low pressure regardless of the first thickness of the internal resin layer.

The internal resin layer may contain resin whose melting point is lower than that of the resin constituting the external resin layer.

According to this constitution, the internal resin layer alone can be thermally processed by pressing the covering film with a heater whose temperature is set higher than the melting point of the resin constituting the internal resin layer but lower than the melting point of the resin constituting the external resin layer, which allows for easy formation of the second region of the internal resin layer.

The internal resin layer may be made of non-oriented polypropylene, while the external resin layer may include a first external resin layer made of nylon and laminated onto the second principal face, as well as a second external resin layer made of polyethylene terephthalate and laminated onto the first external resin layer.

According to this constitution, the second region can be formed easily on the internal resin layer made of non-oriented polypropylene, by means of pressing with the heater, because the melting point of non-oriented polypropylene is lower than the melting point of polyethylene terephthalate or that of nylon.

The groove part may continue to the external resin layer.

According to this constitution, the metal layer can be ruptured quickly in the event of abnormality and the rising internal pressure of the electric storage cell can be released more efficiently.

The groove part may be partially or entirely filled with an insulating material.

This way, the strength of the external resin layer improves to prevent the covering film from rupturing in a normal state.

The insulating material may be resin.

For the insulating material to be filled in the groove part, any of the various insulating materials such as resin, paper, and glass can be used, but resin is preferred from the viewpoint of sealing property.

The difference between the second thickness and the first thickness may be 20 µm or more to 50 µm or less.

By making the second thickness of the internal resin layer smaller than the first thickness by 20 µm or more to 50 µm or less, rupturing of the internal resin layer can be easily facilitated in the second region while still maintaining the strength of the internal resin layer in the first region.

The metal layer may be an aluminum foil having a thickness of 25 µm or more to 80 µm or less, while the groove part may have a depth, in the metal layer, corresponding to one-tenth or more to two-thirds or less of the thickness of the metal layer.

According to this constitution, the metal layer is kept from rupturing when the electric storage cell is in a normal state and permeation of moisture content from the outside can be prevented as a result, by keeping the depth of the groove part in the metal layer to one-tenth or more to two-thirds or less of the thickness of the metal layer. In addition, the release pressure at the groove part can be reduced because the metal layer ruptures quickly in the event of abnormality.

The groove part may have a depth, in the metal layer, corresponding to one-third or more to one-half or less of the thickness of the metal layer.

This way, not only is the metal layer kept from rupturing when the electric storage cell is in a normal state and permeation of moisture content from the outside can be prevented as a result, but the metal layer can also be ruptured quickly in the event of abnormality to release the rising internal pressure of the electric storage cell in a safer manner.

The covering body may have an element housing part that forms a flat surface facing the electric storage element, a seal part formed by internal resin layers thermally fusing with each other along the peripheral edge of the element housing part, and an intermediate part between the element housing part and seal part, and the groove part may be formed in the intermediate part.

When these electric storage cells are stacked to form an electric storage module, each element housing part contacts the adjacent electric storage cell and other members. For this reason, if the groove part is formed in the element housing part, expansion of the internal resin layer at the groove part is prevented by other members. According to the above constitution, however, the groove part is provided at a position where it does not contact other members and therefore expansion of the internal resin layer at the groove part is not prevented by other members and the release pressure at the groove part can be reduced.

The element housing part may be formed by means of embossing.

The covering body may be such that a flexible covering film is used to clad the electric storage element and form the element housing part in the shape of the electric storage element. In addition, the covering body may be such that the element housing part is formed beforehand by means of embossing.

The groove part may be formed in parallel with the peripheral edge of the seal part.

According to this constitution, expansion and rupturing of the internal resin layer at the groove part can be facilitated to reduce the release pressure at the groove part.

To achieve the aforementioned object, a covering film pertaining to an embodiment of the present invention represents a covering film for forming a housing space in which to house an electric storage element, wherein such covering film has a metal layer with a first principal face on the electric storage element side and a second principal face on the opposite side, an internal resin layer made of resin laminated onto the first principal face, and an external resin layer made of resin laminated onto the second principal face, with a groove part formed on the second principal face side of the metal layer.

By cladding the electric storage element with the covering film having the above constitution, a highly reliable electric storage cell can be produced, which is capable of releasing the rising internal pressure safely in the event of abnormality.

The groove part may continue to the external resin layer.

According to this constitution, the metal layer can be ruptured quickly in the event of abnormality and the rising internal pressure of the electric storage cell can be released more efficiently.

The groove part may be partially or entirely filled with an insulating material.

This way, the strength of the external resin layer improves to prevent the covering film from rupturing in a normal state.

The insulating material may be resin.

For the insulating material to be filled in the groove part, any of the various insulating materials such as resin, paper, and glass can be used, but resin is preferred from the viewpoint of sealing property.

To achieve the aforementioned object, an electric storage module pertaining to an embodiment of the present invention represents an electric storage module comprising multiple electric storage cells stacked together.

The electric storage cells each have an electric storage element and a covering body.

The covering body houses the electric storage element and has a metal layer with a first principal face on the electric storage element side and a second principal face on the opposite side, an internal resin layer made of resin laminated onto the first principal face, and an external resin layer made of resin laminated onto the second principal face, as well as an element housing part that houses the electric storage element with the internal resin layer on the electric storage element side and forms a flat surface facing the electric storage element, a seal part formed by internal resin layers thermally fusing with each other along the peripheral edge of the element housing part, and an intermediate part between the housing part and seal part, with a groove part formed on the second principal face side of the metal layer.

According to this constitution, the groove part is provided in the intermediate part of the covering body, or specifically at a position where it does not contact other members, and therefore expansion of the internal resin layer at the groove part is not prevented by other members and the release pressure at the groove part can be reduced.

As described above, according to the present invention a highly reliable electric storage cell, covering film, and electric storage module can be provided, which are capable of releasing the rising internal pressure safely in the event of abnormality.

For purposes of summarizing aspects of the invention and the advantages achieved over the related art, certain objects and advantages of the invention are described in this disclosure. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Further aspects, features and advantages of this invention will become apparent from the detailed description which follows.

BRIEF DESCRIPTION OF THE DRAWINGS

These and other features of this invention will now be described with reference to the drawings of preferred embodiments which are intended to illustrate and not to limit the invention. The drawings are greatly simplified for illustrative purposes and are not necessarily to scale.

FIGS. 17A and 17B show schematic drawings showing the forming process of the thin part of the covering film provided in the electric storage cell.

FIG. 20 is a table showing the results of the electric storage cell pressurization test in the example of the present invention.

DESCRIPTION OF THE SYMBOLS

Figure 1:
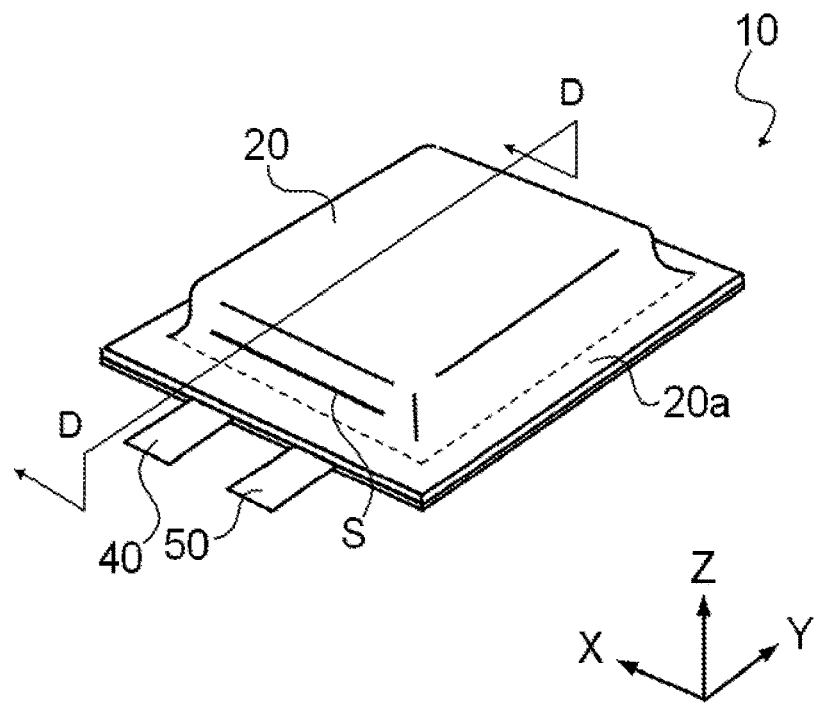
FIG. 1 is a perspective view of an electric storage cell pertaining to an embodiment of the present invention.

10—Electric storage cell
20—Covering film
20a—Seal part
20b—Element housing part
20c—Intermediate part
25—Metal layer
25a—First principal face
25b—Second principal face
26—Internal resin layer
27—External resin layer
30—Electric storage element
100—Electric storage module
S—Groove part

DETAILED DESCRIPTION OF EMBODIMENTS

An embodiment of the present invention is explained below by referring to the drawings.

[Structure of Electric Storage Cell]

Figure 2:
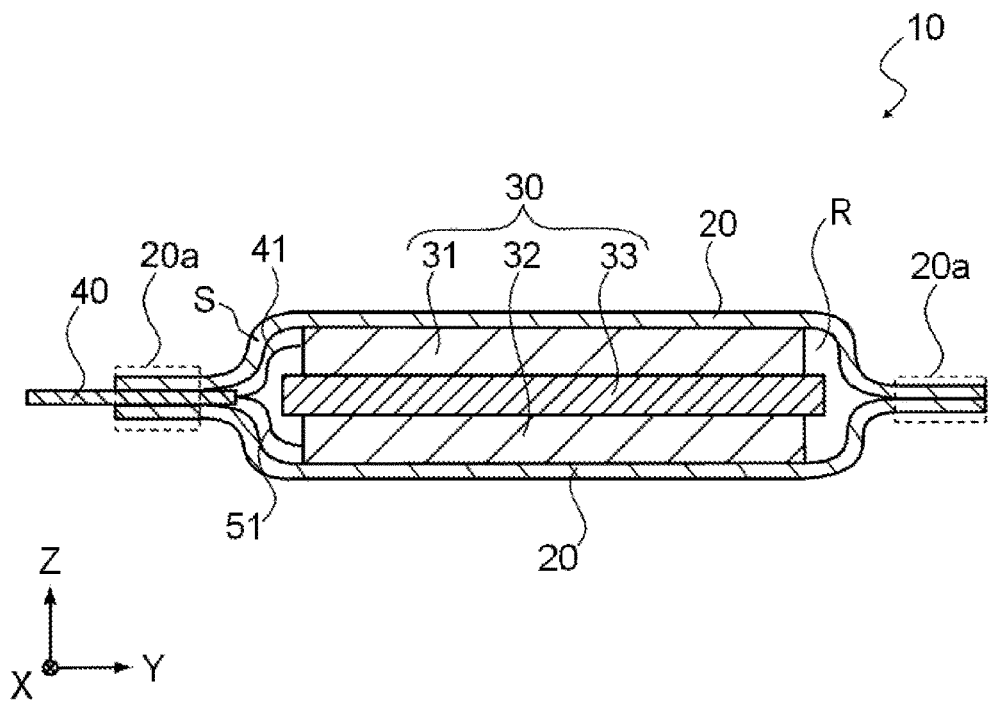
FIG. 2 is a section view of the same electric storage cell.

FIG. 1 is a perspective view of an electric storage cell 10 pertaining to this embodiment, while FIG. 2 is a section view of the electric storage cell 10 cut along line D-D in FIG. 1. In the drawings mentioned below, the X direction, Y direction, and Z direction represent the three directions that intersect at right angles.

As shown in FIG. 1 and FIG. 2, the electric storage cell 10 has covering films 20, an electric storage element 30, a positive electrode terminal 40, and a negative electrode terminal 50.

In the electric storage cell 10, the covering body comprising the two covering films 20 forms a housing space R, and the electric storage element 30 is housed in the housing space R. The two covering films 20 are sealed along the peripheral edge of the electric storage element 30, and the covering body has a seal part 20a. The seal part 20a is described later.

The electric storage element 30, as shown in FIG. 2, has a positive electrode 31, negative electrode 32, and separator 33. The positive electrode 31 and negative electrode 32 are housed in the housing space R in a manner facing each other via the separator 33.

The positive electrode 31 functions as the positive electrode of the electric storage element 30. The positive electrode 31 may be made of a positive electrode material containing a positive electrode active material, binder, etc. The positive electrode active material may be active carbon, for example. Any desired positive electrode active material is selected as deemed appropriate according to the type of the electric storage cell 10.

The negative electrode 32 functions as the negative electrode of the electric storage element 30. The negative electrode 32 may be made of a negative electrode material containing a negative electrode active material, binder, etc. The negative electrode active material may be graphite, hard carbon, or other carbon-group material, for example. A desired negative electrode active material is selected as deemed appropriate according to the type of the electric storage cell 10.

The separator 33 is placed between the positive electrode 31 and negative electrode 32 and allows the electrolytic solution to pass through it, while also preventing the contact between (insulating) the positive electrode 31 and negative electrode 32. The separator 33 may be made of woven fabric, non-woven fabric, resin microporous film, etc.

In FIG. 2, one positive electrode 31 and one negative electrode 32 are provided; however, multiple sets of positive and negative electrodes can also be provided. In this case, the multiple positive electrodes 31 and negative electrodes 32 may be stacked together alternately via the separators 33. Also, the electric storage element 30 may be a laminate of a positive electrode 31, negative electrode 32, and separator 33 that has been rolled up.

The type of the electric storage element 30 is not limited in any way and it may be a lithium ion capacitor, lithium ion battery, electrical double-layer capacitor, etc. Electrolytic solution is housed in the housing space R together with the electric storage element 30. This electrolytic solution may be a propylene carbonate (PC) solution of lithium hexafluorophosphate (LiPF$_6$), etc., for example, but any desired solution can be selected according to the type of the electric storage element 30.

The positive electrode terminal 40 is an external terminal of the positive electrode 31. As shown in FIG. 2, the positive electrode terminal 40 is electrically connected to the positive electrode 31 via positive electrode wiring 41 and led out, in the seal part 20a, from the inside to the outside of the housing space R between the two covering films 20. The positive electrode terminal 40 may be foil, wiring material, etc., made of conductive material.

The negative electrode terminal 50 is an external terminal of the negative electrode 32. As shown in FIG. 2, the negative electrode terminal 50 is electrically connected to the negative electrode 32 via negative electrode wiring 51 and led out, in the seal part 20a, from the inside to the outside of the housing space R between the two covering films 20. The negative electrode terminal 50 may be foil, wiring material, etc., made of conductive material.

Figure 3:
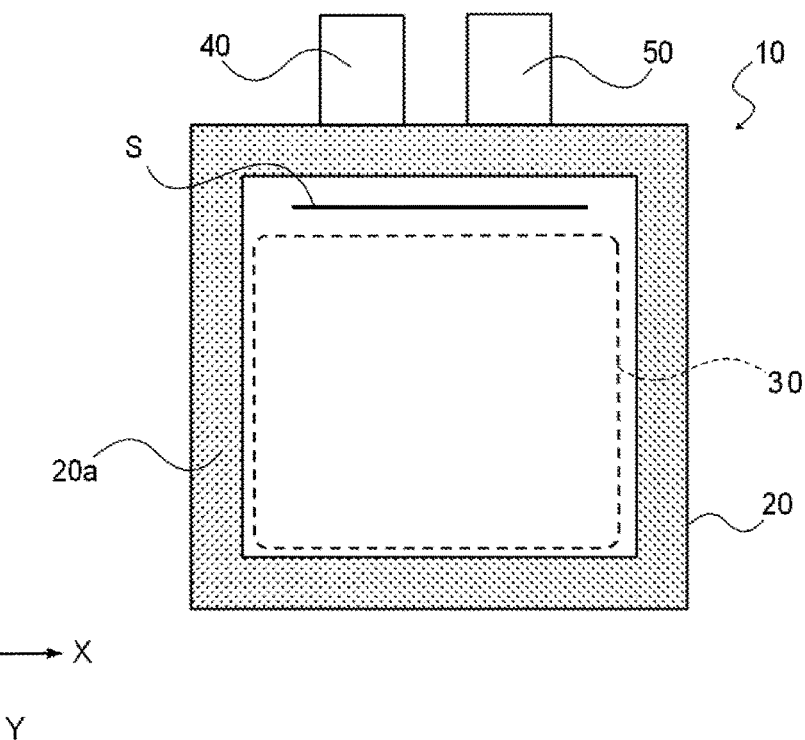
FIG. 3 is a plan view of the same electric storage cell.

FIG. 3 is a schematic drawing of the electric storage cell 10 as viewed from the Z direction. As shown in this figure, the seal part 20a is formed along the peripheral edge of the electric storage element 30. The seal part 20a is formed by the covering films 20 thermally fused to each other, and seals the housing space R. The width of the seal part 20a may be around several millimeters to several tens of millimeters, for example.

[Constitution of Covering Film]

Figure 4:
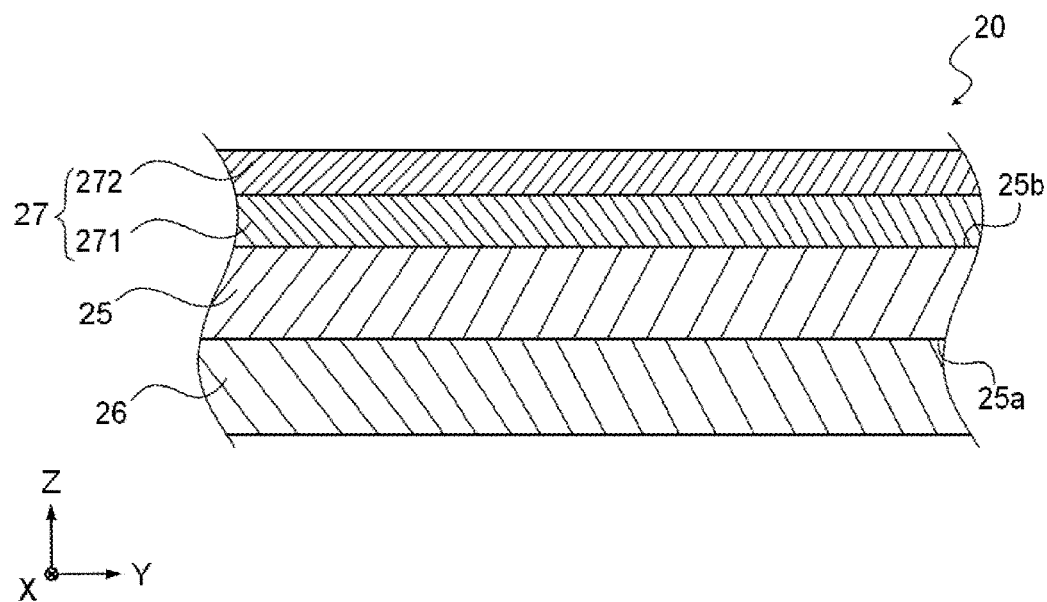
FIG. 4 is a section view of the covering film provided in the electric storage cell.

FIG. 4 is a section view of the covering film 20. As shown in this figure, the covering film 20 comprises a metal layer 25, internal resin layer 26, and external resin layer 27.

The metal layer 25 is a layer made of foil-shaped metal, and functions to prevent the moisture content in air from permeating through. The metal layer 25, as shown in FIG. 4, has a first principal face 25a and a second principal face 25b on the opposite side.

The metal layer 25 may be metal foil made of aluminum, for example. In addition, the metal layer 25 may be foil of copper, nickel, stainless steel, etc. Preferably the thickness of the metal layer 25 is 25 μm or more to 80 μm or less.

The internal resin layer 26 is laminated onto the first principal face 25a to constitute the inner periphery face of the housing space R and clad and insulate the metal layer 25.

The internal resin layer 26 is made of resin, such as non-oriented polypropylene (CPP), for example. In addition, the internal resin layer 26 may be made of polyethylene or acid-modified product thereof, polyphenylene sulfide, polyethylene terephthalate, polyamide, ethylene-vinyl acetate copolymer, etc. The internal resin layer 26 may also comprise multiple resin layers that are stacked together. It should be noted that preferably the material constituting the internal resin layer 26 is one whose melting point is lower than that of the material constituting the external resin layer 27.

The external resin layer 27 is laminated onto the second principal face 25b to constitute the surface of the electric storage cell 10 and clad and protect the metal layer 25.

The external resin layer 27 may be made of two resin layers. As shown in FIG. 4, the external resin layer 27 comprises a first external resin layer 271 and second external resin layer 272 that are stacked together. The external resin layer 27 may also comprise one resin layer.

The first external resin layer 271 may be made of nylon, while the second external resin layer 272 may be made of polyethylene terephthalate. In addition, the first external resin layer 271 and second external resin layer 272 may be made of other materials such as polyethylene naphthalate, biaxially-oriented polypropylene, polyimide, and polycarbonate. It should be noted that preferably the material for the external resin layer 27 (first external resin layer 271 and second external resin layer 272) is one whose melting point is higher than the material constituting the internal resin layer 26.

The covering body comprising the two covering films 20 having the aforementioned constitution, which are facing each other via the electric storage element 30 and sealed at the seal part 20a, forms the housing space R. The internal resin layers 26 of the two covering films 20 are thermally fused to each other at the seal part 20a. The covering films 20 are placed in such a way that their internal resin layer 26 comes to the housing space R side (inside) and the external resin layer 27 comes to the surface side (outside).

The covering films 20 may be used in a manner exhibiting flexibility and forming a shape with curved peripheral edges, as shown in FIG. 2, according to the shape of the electric storage element 30. The covering films 20 may also be used in a manner forming the same shape by means of prior embossing. A groove part is formed in one of the two covering films 20.

[Groove Part]

Figure 5:
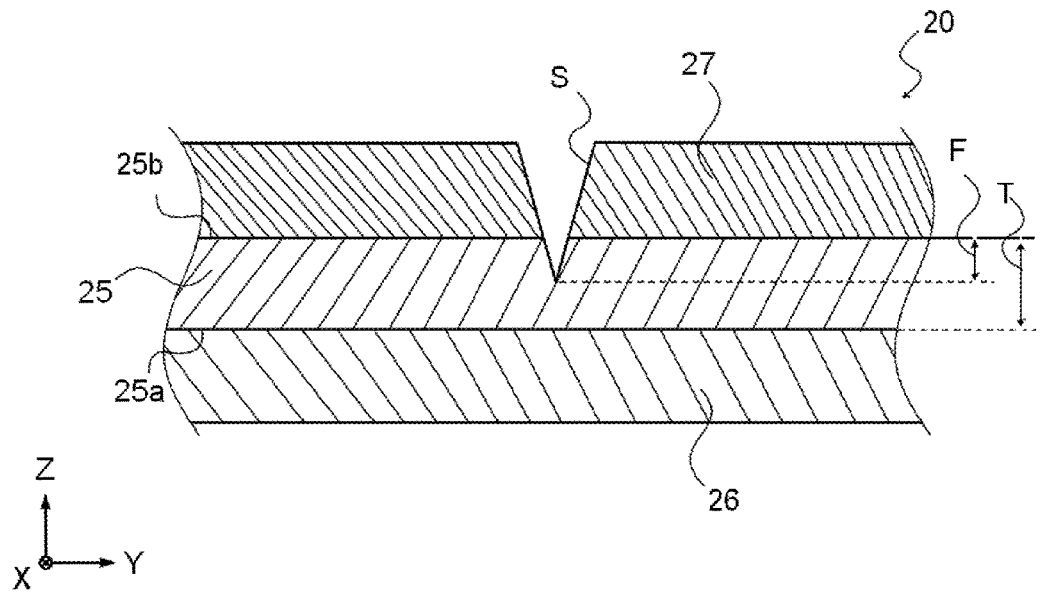
FIG. 5 is a section view of the covering film provided in the electric storage cell.

FIG. 5 is a section view of the covering film 20 including the groove part S. The groove part S, as shown in this figure, is formed from the surface of the external resin layer 27 to a middle of the metal layer 25. The external resin layer 27, as shown in FIG. 5, is completely separated at the location where the groove part S is formed, while the metal layer 25, as shown in the same figure, is partially separated by the groove part S.

To be specific, the groove part S may have, in the metal layer 25, a depth between the first principal face 25a and second principal face 25b. As shown in FIG. 5, the thickness F of the groove part S in the metal layer 25 is preferably one-tenth or more of the thickness T of the metal layer 25 (T/10) to two-thirds or less of the T (2T/3), or more preferably one-third or more of the T (T/3) to one-half or less of the T (T/2).

Figure 6:
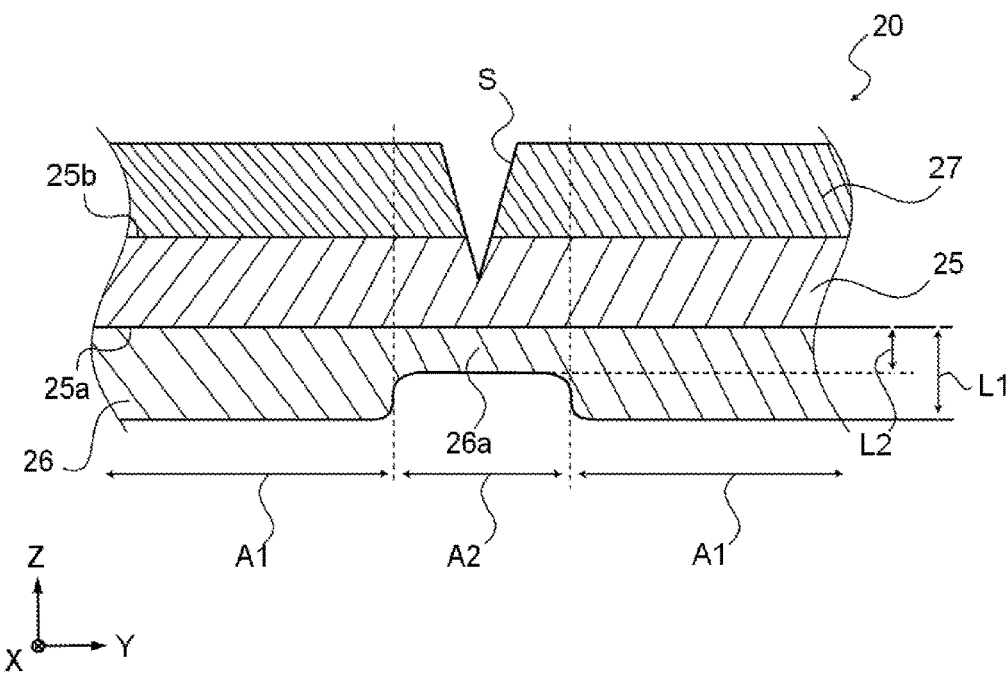
FIG. 6 is a section view of the covering film provided in the electric storage cell.

In addition, the covering film 20 may have a region on the internal resin layer 26 where a thin part is formed, and the groove part S may be formed in this region. FIG. 6 is a section view of a covering film 20 whose internal resin layer 26 has a thin part.

As shown in this figure, the covering film 20 may have a first region A1 where the internal resin layer 26 has a first thickness L1, and a second region A2 where the internal resin layer 26 has a second thickness L2 smaller than the first thickness L1. Of the internal resin layer 26, the part having the second thickness L2 is hereinafter referred to as "thin part 26a." It should be noted that, although the first thickness L1 and second thickness L2 are not limited in any way, preferably the first thickness L1 and second thickness L2 are such that their difference becomes 20 μm or more to 50 μm or less.

The groove part S, as shown in FIG. 6, may be formed in the second region A2. To be specific, the groove part S is formed from the external resin layer 27 in a manner facing the thin part 26a via the metal layer 25. The groove part S may be facing the thin part 26a only partially.

[Effects of Groove Part]

While the electric storage cell 10 is in use, the covering film 20 maintains the condition shown in FIG. 5 or FIG. 6 in a normal state (no abnormality is present in the electric storage element 30) or specifically when the internal pressure of the housing space R is within an allowable range. In this condition, the groove part S does not separate the metal layer 25 completely and therefore permeation of moisture content through the covering film 20 is prevented by the metal layer 25.

If abnormality occurs in the electric storage element 30 while the electric storage cell 10 is in use and the internal pressure rises as a result, the covering film 20 expands. This causes the metal layer 25 to rupture where the groove part S is formed. Next, the internal resin layer 26 projects partially to the outside of the covering film 20 through the opening of the ruptured metal layer 25, and expands. Then, when the internal pressure reaches or exceeds a certain level, the internal resin layer 26 that has projected to the outside ruptures and the internal pressure of the housing space R is released.

As the groove part S is formed this way, the position where the internal resin layer 26 will rupture can be specified beforehand. If the groove part S is not provided, the seal part 20a, which is the weakest part of the covering body, will break open and the internal pressure will be released. In this case, a break-open part of the seal part 20a formed all around the electric storage element 30 along its peripheral edge cannot be specified beforehand.

Preferably the depth of the groove part S is such that the metal layer 25 prevents permeation of moisture content in a normal state, while the metal layer 25 ruptures quickly in the event of abnormality. To be specific, this can be achieved by setting the depth F of the groove part S of the metal layer 25 as one-tenth or more of the thickness T of the metal layer 25 (T/10) to two-thirds or less of the T (2T/3).

Additionally, as mentioned above, the release of internal pressure in the event of abnormality occurs as the internal resin layer 26 ruptures. In other words, the internal pressure at which this release occurs (release pressure) can be adjusted based on the strength of the internal resin layer 26. The strength of the internal resin layer 26 can be adjusted based on the thickness of the internal resin layer 26 and therefore, as shown in FIG. 6, the strength of the internal resin layer 26 can be adjusted by providing the thin part 26a.

Also, as shown in FIG. 5, the internal resin layer 26 may have a constant thickness, in which case the strength of the internal resin layer 26 can be adjusted based on the overall thickness of the internal resin layer 26. Either way, it suffices that the internal pressure that causes the internal resin layer 26 to rupture at the groove part S is lower than the internal pressure that causes the seal part 20a to break open.

[Forming Position of Groove Part]

Figure 7:
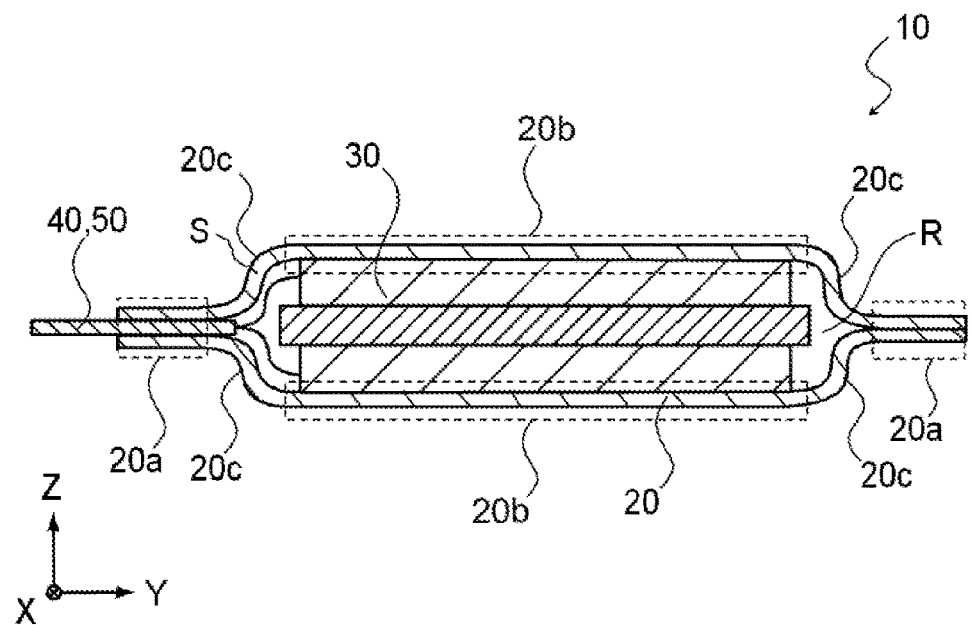
FIG. 7 is a section view of the same electric storage cell.
Figure 8:
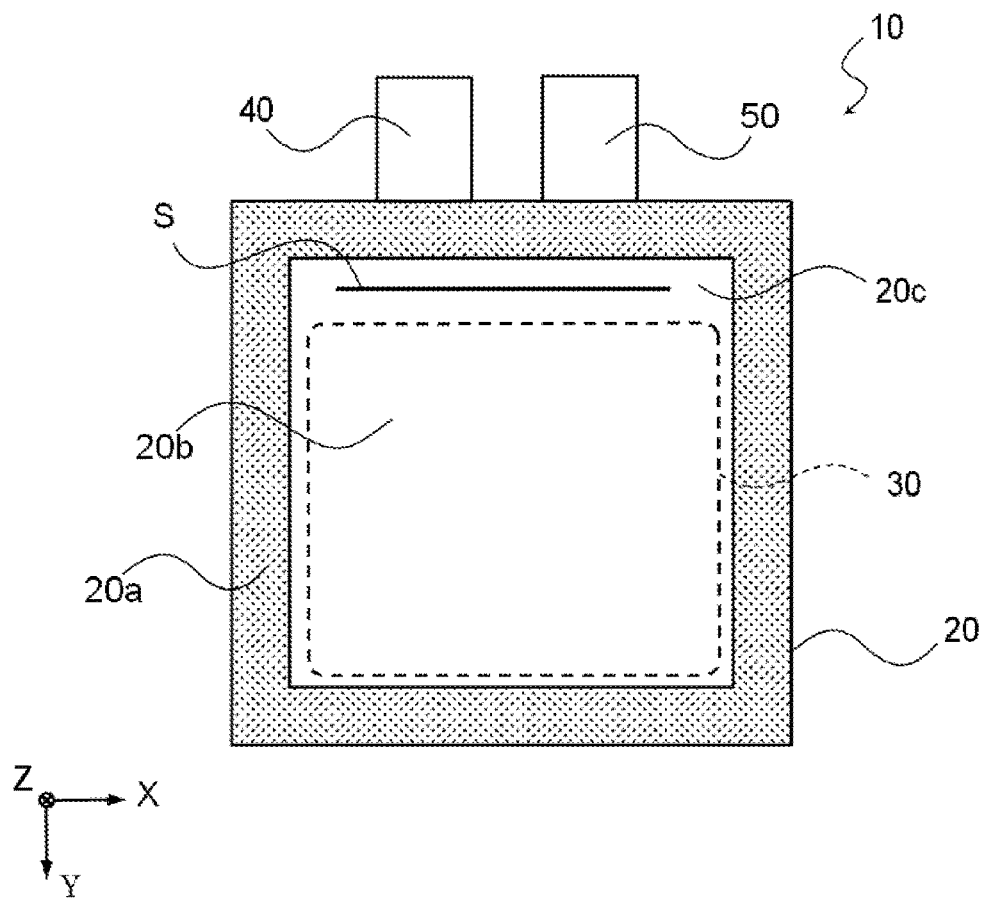
FIG. 8 is a plan view of the same electric storage cell.
Figure 9:
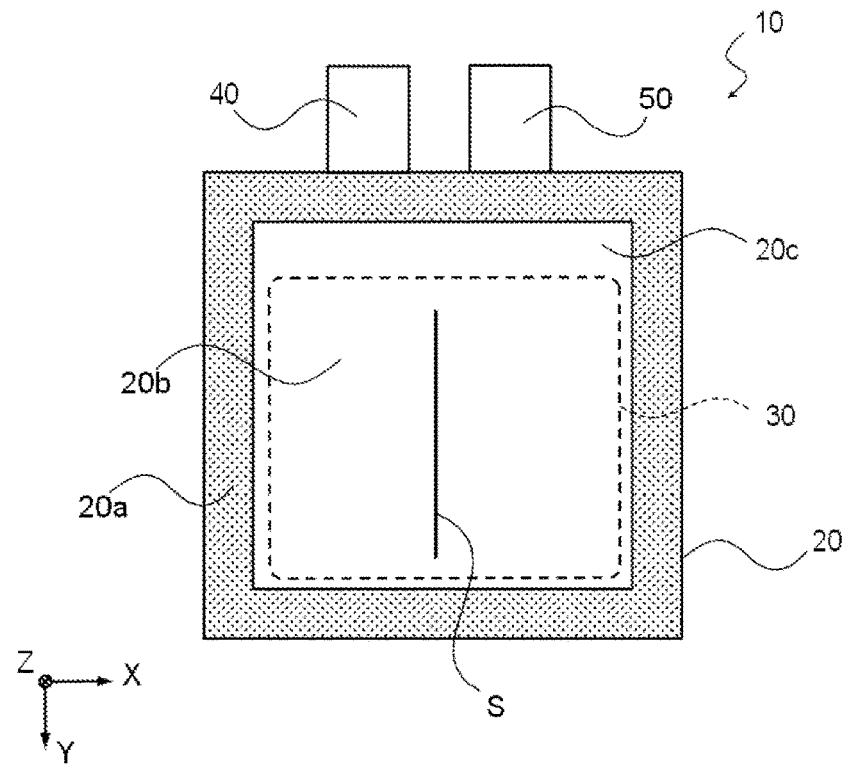
FIG. 9 is a plan view of the same electric storage cell.
Figure 10:
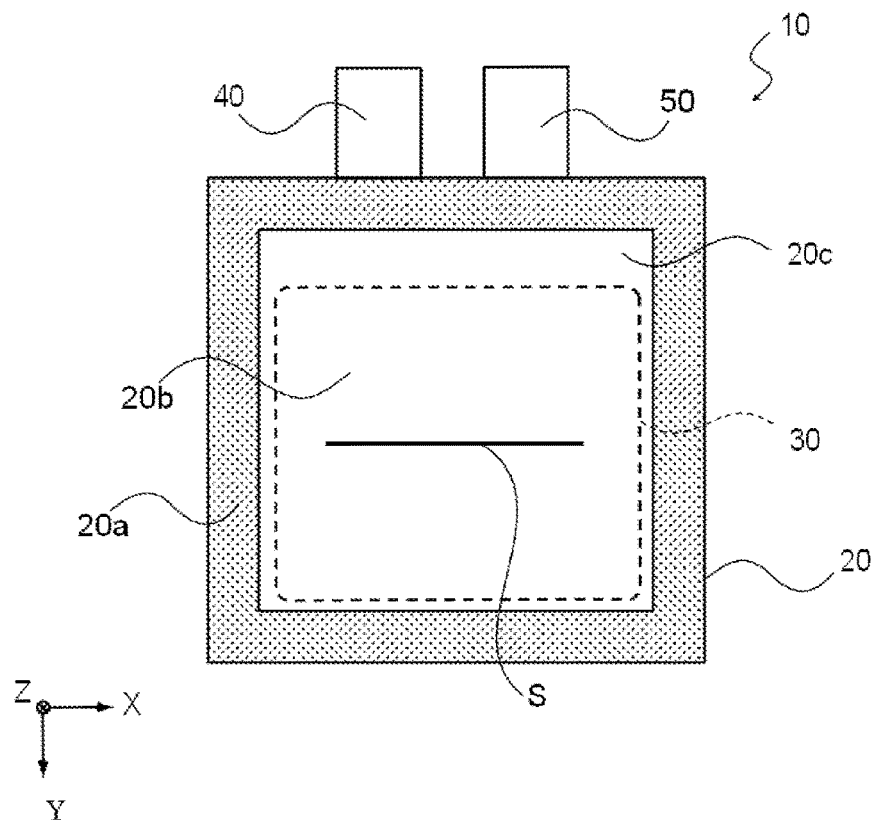
FIG. 10 is a plan view of the same electric storage cell.

The groove part S may be provided on either of the covering films 20 other than in the seal part 20a. FIG. 7 through FIG. 10 are schematic drawings showing the forming position of the groove part S, where FIG. 7 is a section view of the electric storage cell 10, while FIG. 8 through FIG. 10 are plan views of the electric storage cell 10.

As shown in FIG. 7, the part of the covering body that forms a flat surface facing the electric storage element 30 is defined as an "element housing part 20b," while the part between the element housing part 20b and seal part 20a is defined as an "intermediate part 20c."

As shown in FIG. 8, the groove part S may be formed in the intermediate part 20c. To be specific, the groove part S, as shown in this figure, may be formed in parallel with the length direction of the closest seal part 20a for a length of around several tens of millimeters.

Also, the groove part S need not be provided in the intermediate part 20c, but it may be provided on the element housing part 20b, as shown in FIG. 9 and FIG. 10. The extending direction of the groove part S is not limited in any way, and it may be vertical to the length direction of the seal part 20a where the positive electrode terminal 40 and negative electrode terminal 50 are provided, as shown in FIG. 9, or parallel with such length direction, as shown in FIG. 10.

[Electric Storage Module]

Figure 11:
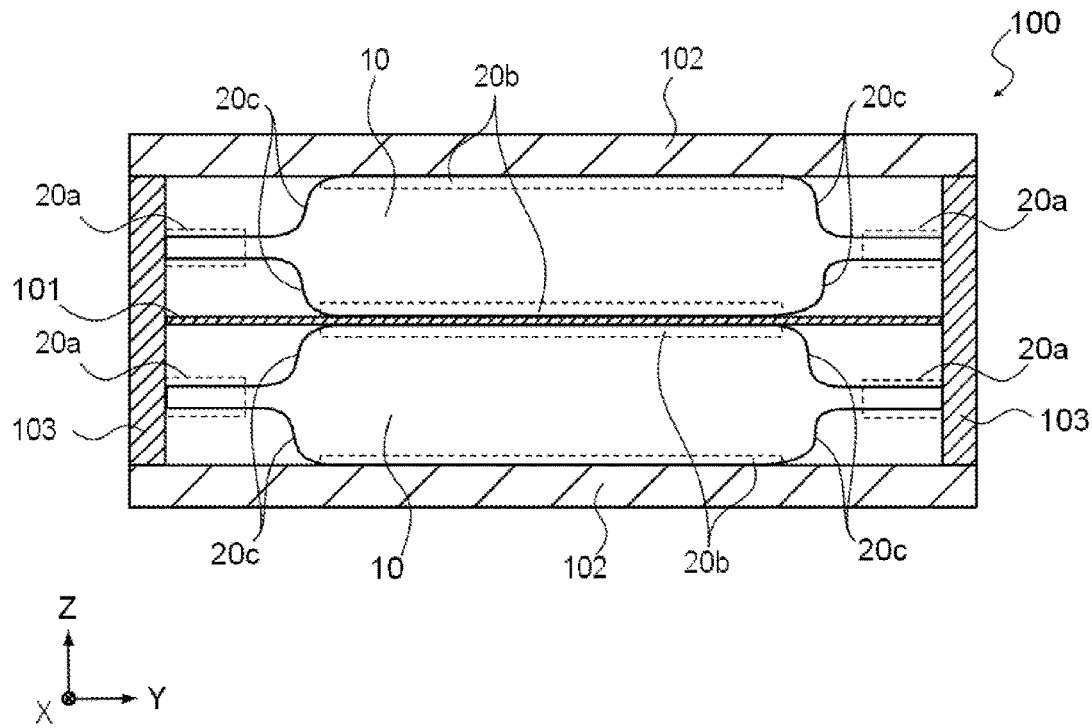
FIG. 11 shows a schematic drawing of an electric storage module pertaining to an embodiment of the present invention.

An electric storage module may be constituted by stacking together multiple units of electric storage cells 10 according to this embodiment. FIG. 11 is a schematic drawing of an electric storage module 100. The electric storage module 100, as shown in this figure, has multiple electric storage cells 10, a thermal conduction sheet 101, plates 102, and supporting members 103.

The multiple electric storage cells 10 are stacked together via the thermal conduction sheet 101 and supported by the supporting members 103. The number of electric storage cells 10 may be two or more. The positive electrode terminals 40 and negative electrode terminals 50 of the electric storage cells 10 may be interconnected between the electric storage cells 10 by wiring or terminals that are not illustrated. The plates 102 are stacked as the topmost face and bottommost face of the multiple electric storage cells 10.

As shown in this figure, stacking the electric storage cells 10 together causes their element housing part 20b to contact the thermal conduction sheet 101 or plate 102. This means that, if the groove part S is formed in the element housing part 20b, these members prevent the internal resin layer 26 from expanding. If the groove part S is formed in the intermediate part 20c, on the other hand, expansion of the internal resin layer 26 is not prevented and the internal pressure can be released at the specified pressure.

[Example of Variation]

Figure 12:
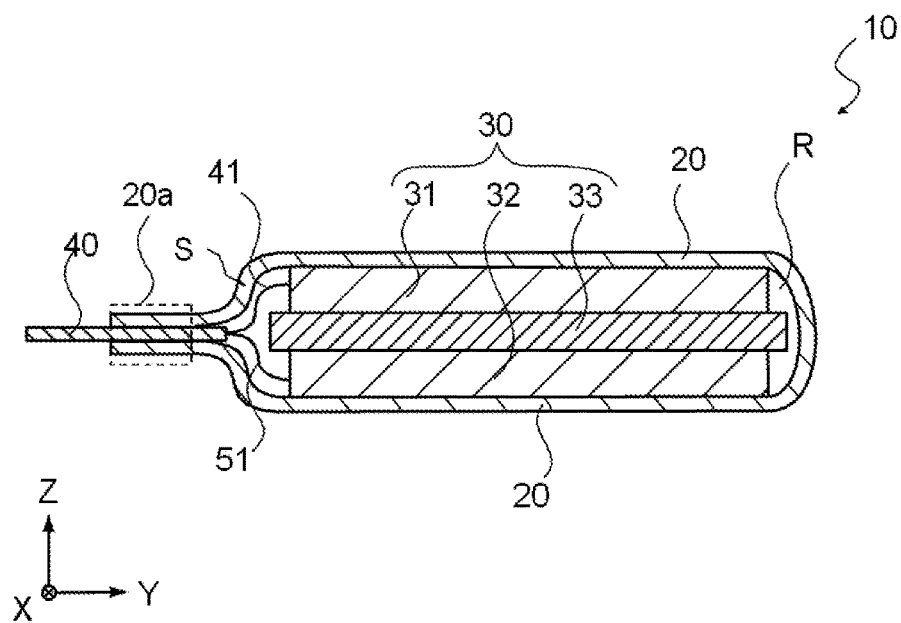
FIG. 12 is a section view of an electric storage cell pertaining to an example of variation of the present invention.
Figure 13:
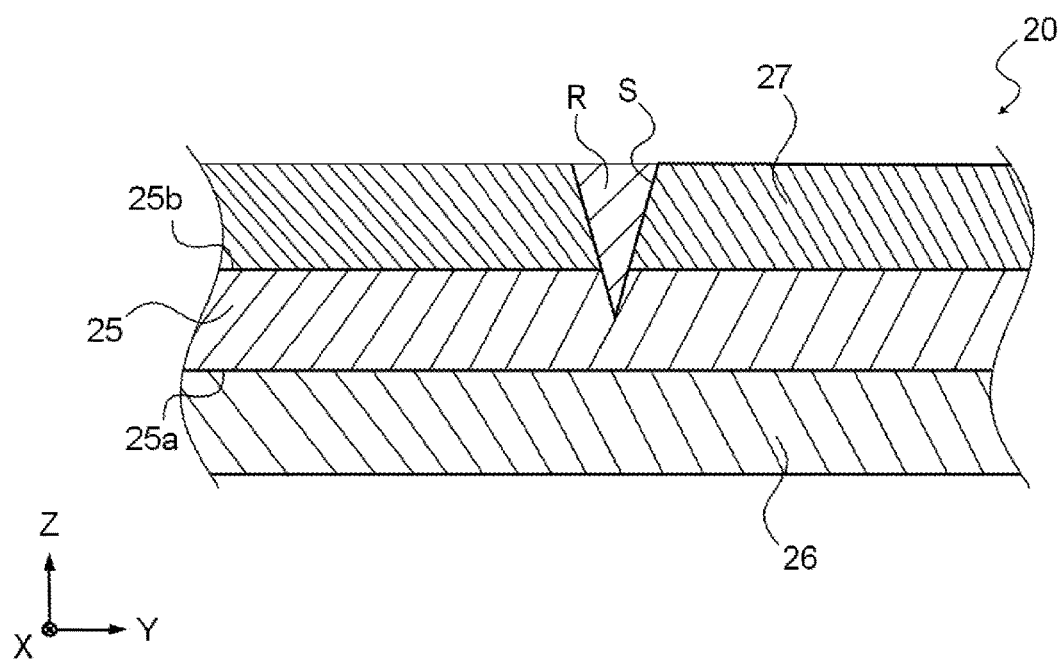
FIG. 13 is a section view of a covering film pertaining to another example of variation of the present invention.

FIG. 12 is a section view showing an electric storage cell 10 pertaining to an example of variation, while FIG. 13 is a section view of a covering film 20 pertaining to another example of variation. In the aforementioned embodiment, the electric storage cell 10 was such that its covering body comprising two covering films 20 sealed the housing space R, but this is not the only embodiment. As shown in FIG. 12, the electric storage cell 10 may be constituted in such a way that one covering film 20 is bent via the electric storage element 30 and its three sides are sealed to form the covering body, which then seals the housing space R. The groove part S, as shown in FIG. 12, may be provided in any part of the covering film 20 other than the seal part 20a.

In addition, the covering film 20, as shown in FIG. 13, may be constituted in such a way that the groove part S is filled with an insulating material R. In this case, the groove part S is partially or entirely filled with the insulating material R. The insulating material R is not limited in any way and any of the various insulating materials such as resin, paper and glass can be used, but resin is preferred from the viewpoint of sealing property.

[Manufacturing Method of Covering Film]

The manufacturing method of the covering film 20 pertaining to this embodiment is explained. It should be noted that the manufacturing method described below is an example and the covering film 20 may be manufactured using a method different from the one shown below.

<Groove Part Forming Process>

Figure 14:
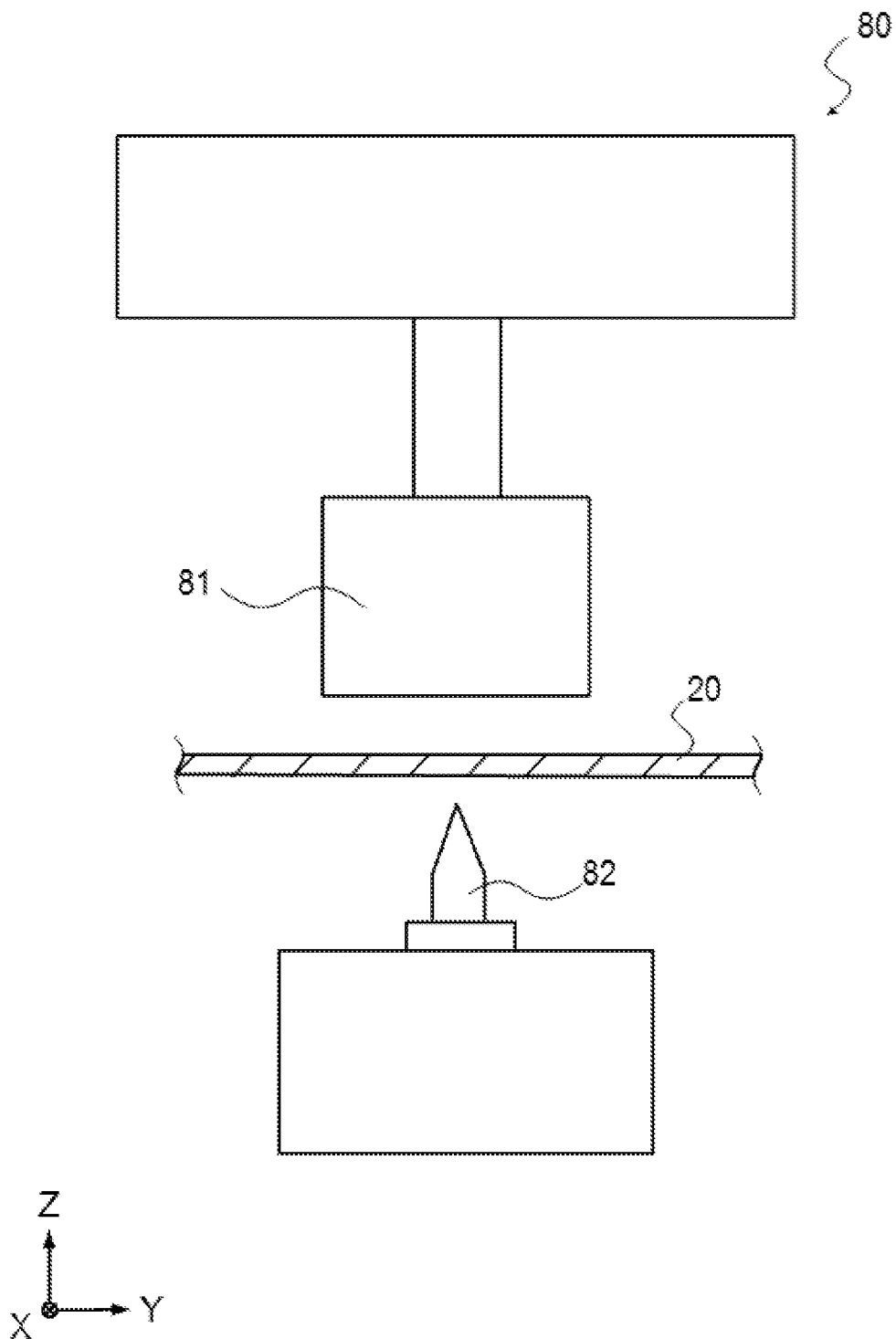
FIG. 14 shows a schematic drawing of a groove-part processing machine that can be utilized in manufacturing the covering film provided in an electric storage cell pertaining to an embodiment of the present invention.

FIG. 14 is a schematic drawing of a groove-part processing machine 80 used for forming the groove part S. The groove-part processing machine 80, as shown in FIG. 14, has a hone 81 and blade 82.

The hone 81 is constituted in such a way that it can be vibrated ultrasonically and is movable in the direction facing the blade 82 (Z direction). The vibrating direction of the hone 81 may be set to the Z direction. The blade 82 is supported in such a way that its tip faces the hone 81. The shape and size of the blade 82 are not limited in any way, and any shape such as straight line, broken line, wavy line, round, square, etc., and any size matching the size of the covering film 20 may be adopted.

Desirably the hone 81 and blade 82 are such that any gap formed between the hone 81 and blade 82 becomes 10 μm or less. It should be noted that the groove-part processing machine 80 may be constituted in such a way that the blade 82 is vibrated ultrasonically instead of the hone 81.

Figure 15A:
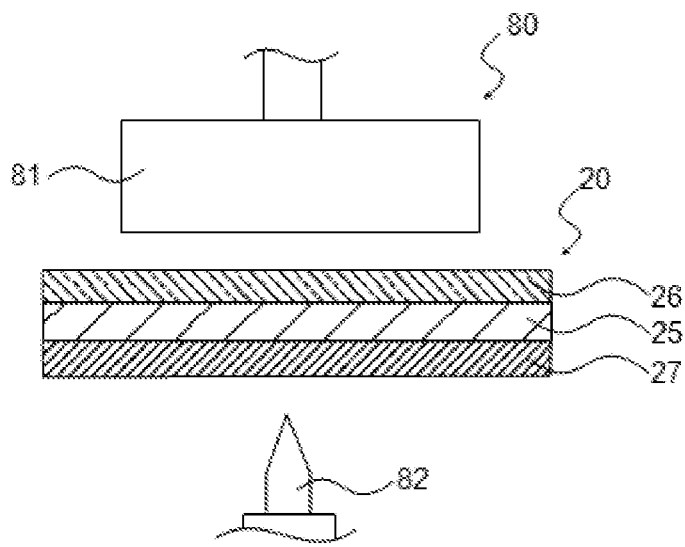
FIGS. 15A, 15B, and 15C show schematic drawings showing the forming process of the groove part of the covering film provided in the electric storage cell.
Figure 15B:
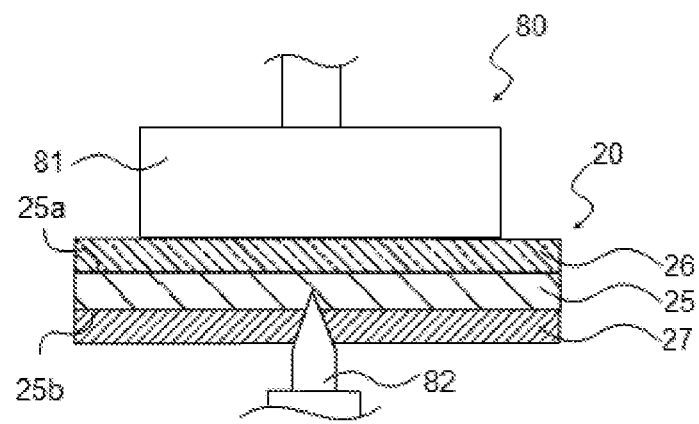
Figure 15C:
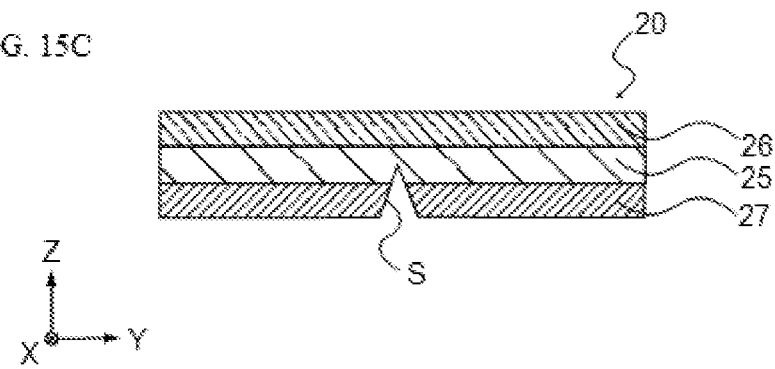

FIGS. 15A, 15B, and 15C illustrate schematic drawings showing the forming process of the groove part. As shown in FIG. 15A, the covering film 20 is set between the blade 82 and hone 81 of the groove-part processing machine 80. Next, as shown in FIG. 15B, the covering film 20 is sandwiched between the hone 81 and blade 82 while vibrating the hone 81 ultrasonically in the Z direction.

At this time, the vibration of the hone 81 in the Z direction propagates to the covering film 20 and, as shown in this figure, the tip of the blade 82 reaches between the first principal face 25a and second principal face 25b of the metal layer 25. As a result, the groove part S is formed on the covering film 20, as shown in FIG. 15C.

The groove part S can also be formed by sandwiching the covering film 20 between the blade 82 and hone 81 while vibrating the blade 82 ultrasonically.

Also, pressing the hone 81 against the covering film 20 without applying ultrasonic vibration results in varying depths of the groove part S depending on the condition of the tip of the blade 82 and the surface condition of the covering film 20. However, processing without ultrasonic vibration is possible so long as the condition of the tip of the blade 82 and the surface condition of the covering film 20 are controlled. Since the groove part S is processed by only around several tens of μm, inconsistent depths of the groove part S will affect the release pressure at the groove part S.

<Forming Process of Thin Part>

Figure 16A:
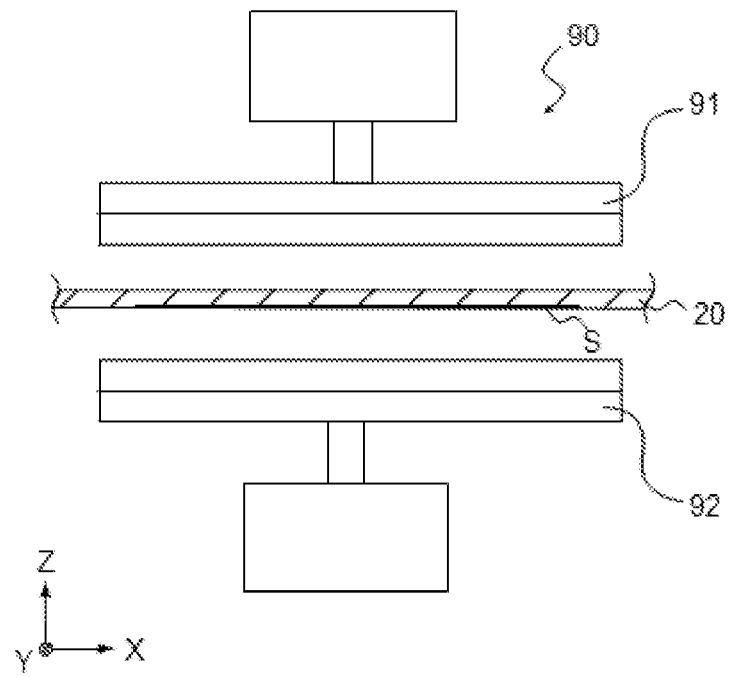
FIGS. 16A and 16B each show schematic drawings of a sealer that can be utilized in manufacturing the covering film provided in the electric storage cell.
Figure 16B:
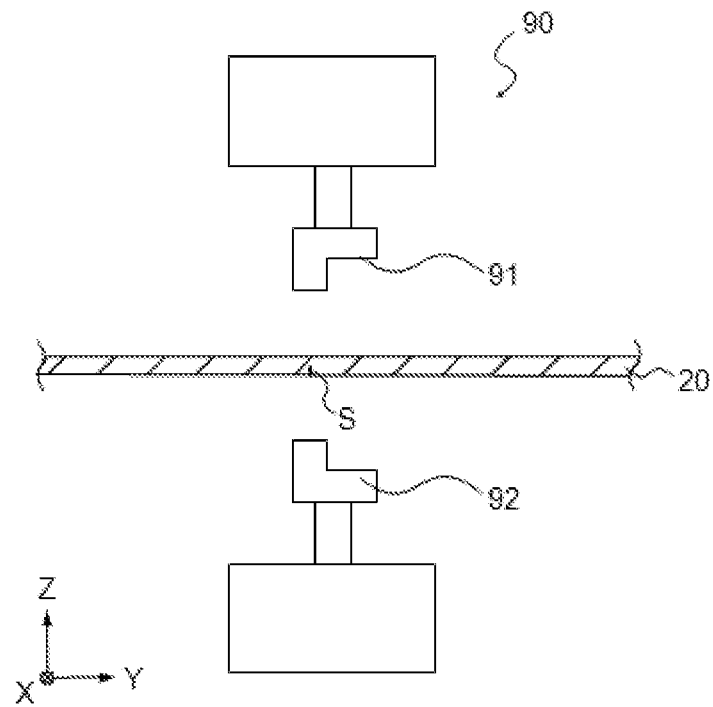

FIGS. 16A and 16B each illustrate a schematic drawing of a sealer 90 used for forming the thin part 26a, where FIG. 16A is a front view and FIG. 16B is a side view. The sealer 90 has a heater 91 and another heater 92.

The heater 91 heats the covering film 20 by pressing it from the internal resin layer 26 side. This heater 91 is temperature-controllable and has a function to provide a variable heater-pressing thrust force with respect to the covering film 20.

The heater 92 heats the covering film 20 by pressing it from the external resin layer 27 side. This heater 92 is temperature-controllable and has a function to provide a variable heater-pressing thrust force with respect to the covering film 20.

The heaters 91, 92 are controlled at the same temperature. Also, desirably the parallelism of the heaters 91, 92 is adjusted to a range of ±0.02 mm in order to ensure a uniform thickness of the thin part 26a.

FIGS. 17A and 17B illustrate schematic drawings showing the forming process of the thin part 26a. The covering film 20 is set to the sealer 90 as shown in FIG. 17A. At this time, the film is set in such a way that the internal resin layer 26 comes to the heater 91 side and the external resin layer 27 comes to the heater 92 side. Next, the heaters 91, 92 are pressed against the covering film 20 to heat the film.

Here, the internal resin layer 26 of the covering film 20 pertaining to this embodiment may be constituted by a material whose melting point is lower than the material constituting the external resin layer 27. This way, the thin part 26a is formed only on the internal resin layer 26 side without crushing the groove part S, as shown in FIG. 17B, by setting the temperature of the heaters 91, 92 higher than the melting point of the material constituting the internal resin layer 26 but lower than the melting point of the material constituting the external resin layer 27.

The crush amount of the thin part 26a can be controlled by adjusting certain parameters such as the temperature, thrust force, and pressing time of the heaters 91, 92. The thin part 26a is ideally formed in a manner facing the entire groove part S, but it may be formed in a manner facing a part of the groove part S so long as the release pressure can be ensured.

<Groove Part Inspection Process>

Figure 18:
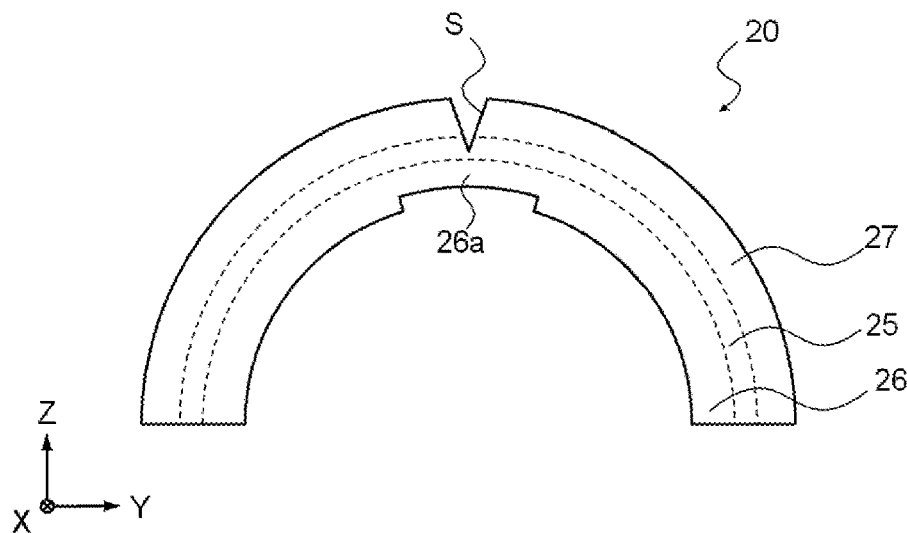
FIG. 18 shows a schematic drawing showing the inspection process of the groove part of the covering film provided in the electric storage cell.

FIG. 18 is a schematic drawing of the inspection process of the covering film 20. The covering film 20 is bent in a cylindrical shape, as shown in FIG. 18, after the thin part 26a and groove part S have been formed, to inspect the depth of the groove part S.

To be specific, as shown in FIG. 18, the covering film 20 is bent in a cylindrical shape to widen the groove part S, and a backlight is illuminated from the internal resin layer 26 side in a dark room, to check for leakage of light from the external resin layer 27 side. At this time, leakage of light from the groove part S is observed if the metal layer 25 is penetrated or cracked. If the metal layer 25 is free from abnormality, no leakage of light from the groove part S is observed. By deforming the covering film 20 in a cylindrical shape, the groove part S is forcibly opened and observation of leakage of light becomes easy.

This inspection method not only allows for checking whether or not the metal layer 25 was penetrated when the groove part S was formed, but it also allows for checking whether or not the metal layer 25 cracked due to the effect of ultrasonic vibration when the groove part S was formed. In addition, this inspection method is a non-destructive inspection and thus supports 100% inspection of covering films 20.

If penetrant solution is permitted to be contacted, the groove part S of the covering film 20 can also be inspected using penetrant solution.

[Manufacturing Method of Electric Storage Cell]

The electric storage cell 10 pertaining to this embodiment can be manufactured by enclosing the electric storage element 30 in the covering film 20 produced according to the aforementioned manufacturing method, filling electrolytic solution, and then sealing the electric storage element with the seal part 20a. To seal the housing space R with two covering films 20, a covering film 20 with a groove part S and covering film 20 without a groove part S can be used. To seal the housing space R with one covering film 20, a covering film 20 with a groove part S can be used.

EXAMPLE

Figure 19:
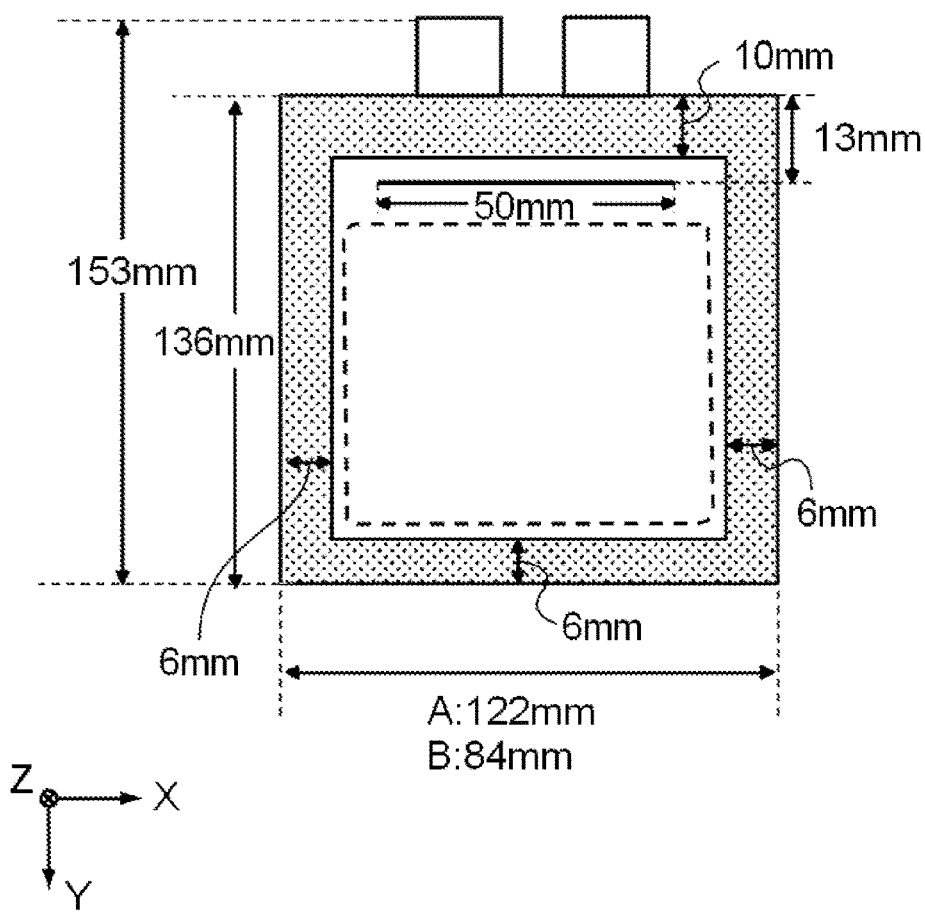
FIG. 19 shows a schematic drawing of an electric storage cell pertaining to an example of the present invention.

An example of the present invention is explained below. The electric storage cell explained in the aforementioned embodiment was produced and evaluated. FIG. 19 is a schematic drawing of the electric storage cell pertaining to the example of the present invention, as viewed from the Z direction.

[Production of Electric Storage Cell]

First, an 80-μm thick internal resin layer made of non-oriented polypropylene (CPP) was laminated onto a 40-μm thick metal layer made of aluminum using adhesive. Next, a 15-μm thick first external resin layer made of oriented nylon was laminated onto the side of the metal layer opposite the one on which the internal resin layer was stacked, using adhesive. Then, a 12-μm thick second external resin layer made of polyethylene terephthalate (PET) was laminated on top of the first external resin layer using adhesive, to produce a laminate film of 156 μm in thickness.

Next, a 50-mm long groove part was formed on the laminate film. The depth of the groove part was such that it penetrated the first external resin layer and second external resin layer and penetrated around one half of the metal layer (20 μm). Next, a thin part was formed on the internal resin layer, to produce a covering film. The thickness of the thin part was set to 30 μm.

Next, the electric storage element was enclosed by the covering film on which the groove part was formed and the covering film on which no groove part was formed, after which the internal resin layers of both covering films were thermally fused to form a seal part (refer to FIG. 2) and thereby seal the electric storage element, to obtain an electric storage cell. At this time, as shown in FIG. 19, the width of the seal part was set to 10 mm on the positive electrode terminal and negative electrode terminal side, and elsewhere the width of the seal part was set to 6 mm. Also, as shown in the same figure, the groove part was formed at a position 13 mm from the edge of the seal part on the positive electrode terminal and negative electrode terminal side.

Two types of electric storage cells of different sizes were produced. Electric storage cell A had an X-direction width of 122 mm. Electric storage cell B had an X-direction width of 84 mm. Also, a version without thin part on the internal resin layer was produced for both electric storage cell A and electric storage cell B.

[Electric Storage Cell Pressurization Test]

The release pressure of each electric storage cell was measured. Measurement was performed with the electric storage cell being sandwiched between plates and not being sandwiched between plates. The plate-sandwiched condition recreates the condition of the electric storage cell in the electric storage module.

The measured results are shown in FIG. 20. "Free" indicates a result of measuring the electric storage cell not being sandwiched between plates, while "Pressed" indicates a result of measuring it while sandwiched between plates. As shown in this figure, the electric storage cells in which a thin part was formed had lower release pressure regardless of the size of the electric storage cell or the condition of the electric storage element. It should be noted that, with either structure, pressure release occurred from the groove part.

Accordingly, these results confirmed that, by forming a thin part on the internal resin layer, the release pressure by the groove part could be reduced and the safety of the electric storage cell could be improved.

In the present disclosure where conditions and/or structures are not specified, a skilled artisan in the art can readily provide such conditions and/or structures, in view of the present disclosure, as a matter of routine experimentation. Also, in the present disclosure including the examples described above, any ranges applied in some embodiments may include or exclude the lower and/or upper endpoints, and any values of variables indicated may refer to precise values or approximate values and include equivalents, and may refer to average, median, representative, majority, etc. in some embodiments. Further, in this disclosure, "a" may refer to a species or a genus including multiple species, and "the invention" or "the present invention" may refer to at least one of the embodiments or aspects explicitly, necessarily, or inherently disclosed herein. The terms "constituted by" and "having" refer independently to "typically or broadly comprising", "comprising", "consisting essentially of", or "consisting of" in some embodiments. In this disclosure, any defined meanings do not necessarily exclude ordinary and customary meanings in some embodiments.

The present application claims priority to Japanese Patent Application No. 2015-42848, filed Mar. 4, 2015, and No. 2015-225920, filed Nov. 18, 2015, each disclosure of which is incorporated herein by reference in its entirety including any and all particular combinations of the features disclosed therein.

It will be understood by those of skill in the art that numerous and various modifications can be made without departing from the spirit of the present invention. Therefore, it should be clearly understood that the forms of the present invention are illustrative only and are not intended to limit the scope of the present invention.

We claim:

1. An electric storage cell comprising:
an electric storage element; and
a covering body that houses the electric storage element and is constituted by a covering film having:
a metal layer with a first principal face on an electric storage element side and a second principal face on an opposite side,
an internal resin layer made of resin laminated onto the first principal face, and
an external resin layer made of resin laminated onto the second principal face,
wherein a groove part is formed in the metal layer in a thickness direction of the covering film on a second principal face side of the metal layer, and
the covering film has a first region where the internal resin layer has a first thickness and a second region constituted by a recess formed in an inner-side surface of the internal resin layer opposite to an interface side between the metal layer and the internal resin layer where the internal resin layer has a second thickness smaller than the first thickness in a thickness direction of the covering film, and the groove part is aligned with the recess of the second region in the thickness direction.

2. An electric storage cell according to claim 1, wherein:
the internal resin layer contains resin whose melting point is lower than that of resin constituting the external resin layer.

3. An electric storage cell according to claim 2, wherein:
the internal resin layer is made of non-oriented polypropylene, and the external resin layer includes a first external resin layer made of nylon and laminated onto the second principal face, as well as a second external resin layer made of polyethylene terephthalate and laminated onto the first external resin layer.

4. An electric storage cell according to claim 3, wherein:
the groove part continues to the external resin layer.

5. An electric storage cell according to claim 4, wherein:
the groove part is partially or entirely filled with an insulating material.

6. An electric storage cell according to claim 5, wherein:
the insulating material is resin.

7. An electric storage cell according to claim 1, wherein:
a difference between the second thickness and the first thickness is 20 μm or more to 50 μm or less.

8. An electric storage cell according to claim 1, wherein:
the metal layer is an aluminum foil having a thickness of 25 μm or more to 80 μm or less, and the groove part has a depth, in the metal layer, corresponding to one-tenth or more to two-thirds or less of a thickness of the metal layer.

9. An electric storage cell according to claim 8, wherein:
the groove part has a depth, in the metal layer, corresponding to one-third or more to one-half or less of the thickness of the metal layer.

10. An electric storage cell according to claim 1, wherein:
the covering body has an element housing part that forms a flat surface facing the electric storage element, a seal part formed by internal resin layers thermally fused to each other along a peripheral edge of the element housing part, and an intermediate part between the element housing part and seal part, and the groove part is formed in the intermediate part.

11. An electric storage cell according to claim 10, wherein:
the element housing part is formed by means of embossing.

12. An electric storage cell according to claim 10, wherein:
the groove part is formed in parallel with a peripheral edge of the seal part.

13. A covering film for forming a housing space in which to house an electric storage element, comprising:
a metal layer with a first principal face on an electric storage element side and a second principal face on an opposite side,
an internal resin layer made of resin laminated onto the first principal face; and
an external resin layer made of resin laminated onto the second principal face,
wherein a groove part is formed in the metal layer in a thickness direction of the covering film on a second principal face side of the metal layer, through the external resin layer, wherein the groove part extends continuously and steplessly from the external resin layer into the metal layer in a thickness direction of the covering film, and
wherein the covering film has a first region where the internal resin layer has a first thickness and a second region constituted by a recess formed in an inner-side surface of the internal resin layer opposite to an interface side between the metal layer and the internal resin layer where the internal resin layer has a second thickness smaller than the first thickness in a thickness direction of the covering film, and the groove part is aligned with the recess of the second region in the thickness direction.

14. A covering film according to claim 13, wherein:
the groove part is partially or entirely filled with an insulating material.

15. A covering film according to claim 14, wherein:
the insulating material is resin.

16. An electric storage module comprising multiple electric storage cells stacked together, wherein the electric storage cell has:
an electric storage element; and
a covering body that houses the electric storage element and is constituted by a covering film having:
a metal layer with a first principal face on an electric storage element side and a second principal face on an opposite side,
an internal resin layer made of resin laminated onto the first principal face, and
an external resin layer made of resin laminated onto the second principal face,
wherein the covering body is constituted by:
an element housing part that forms a flat surface facing the electric storage element,
a seal part formed by internal resin layers thermally fused to each other along a peripheral edge of the element housing part; and
an intermediate part between the housing part and seal part,
wherein a groove part is formed in the intermediate part in the metal layer on the second principal face side of the metal layer, through the external resin layer, wherein the groove part extends continuously and steplessly from the external resin layer into the metal layer in a thickness direction of the covering film, wherein the groove part is elongated in a straight line and provided in parallel to a boundary line between the intermediate part and the seal part.

17. An electric storage cell comprising:
an electric storage element; and
a covering body that houses the electric storage element and is constituted by the covering film of claim 13.

* * * * *